United States Patent
Jung et al.

(10) Patent No.: US 9,661,493 B2
(45) Date of Patent: May 23, 2017

(54) APPARATUS AND METHOD FOR PROVIDING A WIRELESS COMMUNICATION IN A PORTABLE TERMINAL

(71) Applicant: Samsung Electronics Co., Ltd., Gyeonggi-do (KR)

(72) Inventors: Bu-Seop Jung, Gyeonggi-do (KR); Moon-Soo Kim, Seoul (KR); Jun-Ho Lee, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 14/187,734

(22) Filed: Feb. 24, 2014

(65) Prior Publication Data
US 2014/0241271 A1    Aug. 28, 2014

(30) Foreign Application Priority Data

Feb. 22, 2013    (KR) .................. 10-2013-0019131

(51) Int. Cl.
*H04W 8/26* (2009.01)
*H04L 29/12* (2006.01)

(52) U.S. Cl.
CPC ........... *H04W 8/26* (2013.01); *H04L 61/2015* (2013.01)

(58) Field of Classification Search
CPC ............. H04L 12/2807; H04L 29/1232; H04L 61/2015; H04L 61/2092; H04L 63/10; H04L 63/14
USPC ........................... 370/254–350; 709/201–213
See application file for complete search history.

(56) References Cited

U.S. PATENT DOCUMENTS

| 6,657,981 | B1 | 12/2003 | Lee et al. |
| 7,082,114 | B1 | 7/2006 | Engwer et al. |
| 7,443,809 | B2* | 10/2008 | Bajic ............... H04W 8/12 370/254 |
| 7,925,772 | B2* | 4/2011 | Fujita .................. 709/231 |

(Continued)

FOREIGN PATENT DOCUMENTS

EP    2 451 213 A1    5/2012

OTHER PUBLICATIONS

"IEEE Trial-Use Recommended Practice for Multi-Vendor Access Point Interoperability via an Inter-Access Point Protocol Across Distribution Systems Supporting IEEE 802.11 Operation"; IEEE Standards; Jul. 14, 2003; The Institute of Electrical and Electronics Engineers, Inc.; New York, NY; XP017603612.

*Primary Examiner* — Ayaz Sheikh
*Assistant Examiner* — Debebe Asefa
(74) *Attorney, Agent, or Firm* — Cha & Reiter, LLC

(57) ABSTRACT

An apparatus for providing a wireless communication in a portable terminal includes a wireless communication unit and a controller which verifies basic service set identifications (BSSIDs) of access points when roaming between access points is completed, verifies whether an internet protocol (IP) address is assigned based on a wireless communication network list and the verified BSSIDs, and performs a wireless communication by using an IP address which is in use according to a verification result, wherein the wireless communication network list is a list which classifies a plurality of access points according to the same dynamic host configuration protocol (DHCP) by using BSSIDs of the plurality of access points connected to the portable terminal.

17 Claims, 6 Drawing Sheets

(56) References Cited

U.S. PATENT DOCUMENTS

| | | | |
|---|---|---|---|
| 8,750,242 B2* | 6/2014 | Forte | H04W 36/0011 370/331 |
| 2003/0031151 A1 | 2/2003 | Sharma et al. | |
| 2003/0039234 A1 | 2/2003 | Sharma et al. | |
| 2006/0245393 A1 | 11/2006 | Bajic | |
| 2006/0268834 A1 | 11/2006 | Bajic | |
| 2008/0112362 A1 | 5/2008 | Korus | |

* cited by examiner

APPARATUS AND METHOD FOR PROVIDING A WIRELESS COMMUNICATION IN A PORTABLE TERMINAL

CLAIM OF PRIORITY

This application claims priority under 35 U.S.C. §119(a) to Korean Application Serial No. 10-2013-0019131, which was filed in the Korean Intellectual Property Office on Feb. 22, 2013, the entire content of which is hereby incorporated by reference.

BACKGROUND

1. Technical Field

The present disclosure relates generally to a portable terminal, and more particularly, to an apparatus and a method for providing a wireless communication in a portable terminal.

2. Description of the Related Art

A portable terminal such as a smart phone and a tablet provide various useful features to a user through various applications. Therefore, the portable terminal is in a trend of becoming a device capable of providing a voice call function as well as various forms of information through providing various functions. In particular, such portable terminals provide a wireless communication function for providing a data service.

Whenever the portable terminal which provides the wireless communication function moves between access points that have different basic service sets (hereinafter, "BSS"), the portable terminal is assigned a new internet protocol (IP) address by requesting assignment of the new IP address and performs the wireless communication by using the new IP address.

However, there is a problem in that wireless communication can be disconnected due to the time consumption for assigning the IP address. Also, there is the problem of power consumption of the portable terminal due to sending/receiving a message for assigning the IP address.

SUMMARY

Accordingly, an aspect of the present invention is to provide an apparatus and a method for providing a wireless communication in a portable terminal, in which the phenomenon of the wireless communication becoming disconnected is minimized.

Another aspect of the present invention is to provide an apparatus and a method for providing a wireless communication in a portable terminal in which power consumption is minimized.

In accordance with one aspect of the present invention, an apparatus for providing a wireless communication (for example in a portable terminal) is provided. The apparatus includes a wireless communication unit; and a controller which verifies basic service set identifications (BSSIDs) of access points when roaming between access points is completed (in other words, it can verify the BSSIDs of the access points whose cells it has roamed through, when roaming has taken place/occurred), verifies whether an internet protocol (IP) address is to be assigned based on a wireless communication network list and the verified BSSIDs, and perform a wireless communication by using an IP address corresponding to a verification result, wherein the wireless communication network list is a list which classifies a plurality of access points according to each of dynamic host configuration protocol (DHCP) server by using BSSIDs of the plurality of access points which were connected to the portable terminal. In other words, the list classifies the access points, using their BSSIDs, according to which DHCP server they are connected to, or otherwise associated with).

In accordance with another aspect of the present invention, a method for providing a wireless communication in a portable terminal is provided. The method includes verifying basic service set identifications (BSSIDs) of access points when roaming between access points is completed; verifying whether an internet protocol (IP) address is to be assigned based on a wireless communication network list and the verified BSSIDs, and performing a wireless communication by using an IP address corresponding to a verification result, wherein the wireless communication network list is a list which classifies a plurality of access points according to each of dynamic host configuration protocol (DHCP) server by using BSSIDs of the plurality of access points which were connected to the portable terminal. The method may also be described as a method of operating a portable terminal, or a method of providing wireless communication using a portable terminal.

Therefore, an apparatus and a method according to the present invention provides a wireless communication in a portable terminal, thereby achieving an effect of minimizing disconnection of wireless communication.

Further, an apparatus and a method according to the present invention provides a wireless communication in the portable terminal, thereby achieving an effect of minimizing power consumption.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION

Hereinafter, various embodiments of the present invention will be described with reference to the accompanying drawings. In the following description, a detailed description of known functions and configurations incorporated herein will be omitted when it may make the subject matter of the present invention rather unclear.

A portable terminal according to an exemplary embodiment of the present invention is an electronic device which is easy to carry and may be a video phone, a portable phone, a smart phone, an international mobile telecommunication 2000 (IMT-2000) terminal, a WCDMA terminal, a universal mobile telecommunication service (UMTS) terminal, a personal digital assistant (PDA), a portable multimedia player (PMP), a digital multimedia broadcasting (DMB) terminal, an E-Book, a portable computer such as a laptop or a tablet, or a digital camera.

Figure 1:
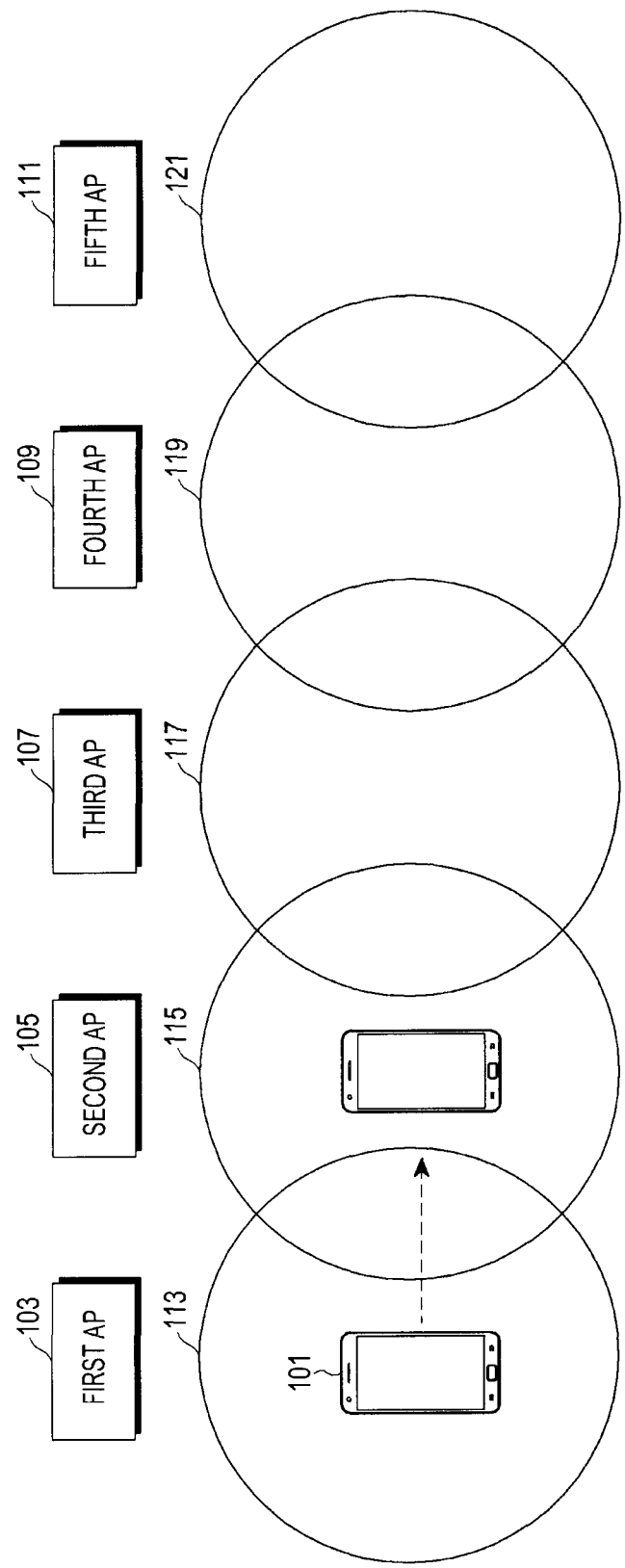
FIG. 1 illustrates a configuration of an example wireless communication system according to an exemplary embodiment of the present invention.

FIG. 1 illustrates configuration of an example wireless communication system according to an exemplary embodiment of the present invention.

Referring to FIG. 1, the wireless communication system includes a portable terminal 101 and first to fifth access points 103, 105, 107, 109, 111.

Regarding each element, the first to fifth access points 103, 105, 107, 109, 111 can respectively provide wireless service to portable terminals in first to fifth cells 113, 115, 117, 119, 121. In particular, each of the first to fifth access points (hereinafter, "AP") is capable of providing a data service to the portable terminal 101 through a specific wireless communication protocol if the portable terminal 101 is located within its cell. Here, the specific wireless communication may be Wireless Fidelity (hereinafter, "Wi-Fi"). Wi-Fi refers to a short range network technology which enables wireless internet within a certain distance by using a radio wave or infrared transmission method in a location in which the access point is installed.

When Wi-Fi roaming is completed, the portable terminal 101 verifies the basic service set identification (hereinafter, "BSSID") of an existing AP and a BSSID of a current AP. Here, the Wi-Fi roaming refers to a technology for providing a roaming service which prevents Wi-Fi communication from being disconnected even when the portable terminal 101 moves between APs that have different basic service sets (BSS). Also, the current AP refers to an AP which forms a cell in which the portable terminal 101 is currently located, and the existing AP refers to an AP which forms a cell in which the portable terminal 101 is located prior to movement thereof. Also, the BSSID has 48 bits and is used to distinguish basic service sets (BSS). If the wireless communication network is an infrastructure BSS network, the BSSID may be a medium access control (MAC) of AP equipment. On the other hand, if the wireless communication network is an independent BSS or an ad hoc network, the BSSID is generated as a random value.

Figure 3:
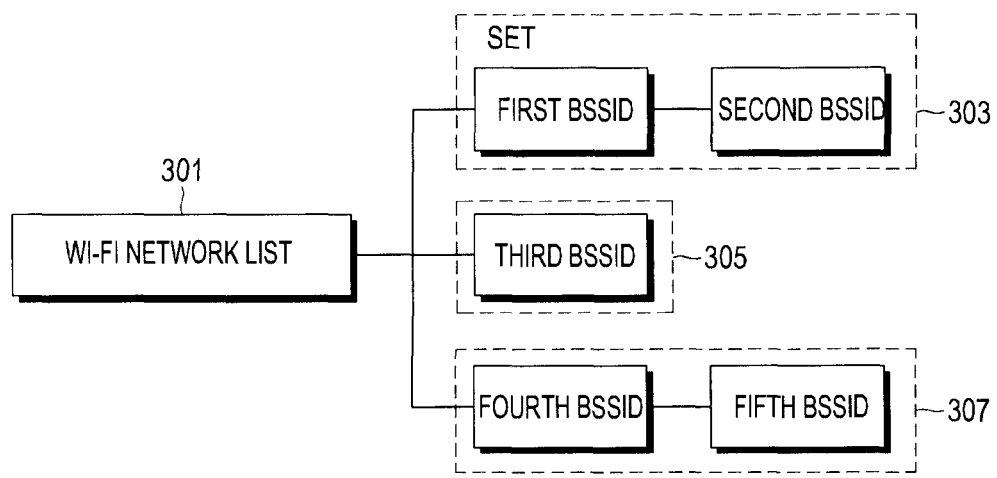
FIG. 3 is a view illustrating a Wi-Fi network list according to an exemplary embodiment of the present invention.

The portable terminal 101 determines whether to be assigned an internet protocol (IP) address by using a pre-stored Wi-Fi network list and the verified BSSIDs which correspond to the AP. Here, the Wi-Fi network list refers to a list which distinguishes a plurality of APs according to each of dynamic host configuration protocol (hereinafter, "DHCP") server by using BSSIDs of a plurality of APs which were connected to the portable terminal 101. For example, if a first and a second APs are connected to a first DHCP server, a third AP is connected to a second DHCP server, and a fourth and a fifth APs are connected to a third DHCP server, the Wi-Fi network list 301 may include a first set 303 that includes a BSSID of the first AP 103 and a BSSID of the second AP 105, a second set 305 that includes a BSSID of the third AP 107, and a third set 307 that includes a BSSID of the fourth AP 109 and a BSSID of the fifth AP 111, as shown in FIG. 3.

When it is determined that IP address assignment is not needed, the portable terminal 101 performs the Wi-Fi communication by using an existing IP address.

In contrast, when it is determined that the IP address assignment is needed, the portable terminal 101 performs a DHCP procedure for receiving an IP address such that a new IP address is assigned from the DHCP server and the Wi-Fi communication is performed by using the assigned new IP address. The DHCP procedure is a procedure for the portable terminal 101 to be assigned to the new IP address from the DHCP server, which includes the following four steps:

1. DHCP Discovery Step

In order to discover a DHCP server located on the same subnet, the portable terminal 101 broadcasts a DHCP discover message to an Ethernet network (here, the portable terminal 101 sets a destination MAC of an Ethernet header as Broadcast MAC=FF:FF:FF:FF:FF:FF). Through the DHCP discovery step, all DHCP servers that are located on the same subnet receive the DHCP discover message.

2. DHCP Proposal Step

The DHCP server that receives the DHCP discover message broadcasts a DHCP offer message to the Ethernet network to announce its presence (here, because the portable terminal 101 hasn't received an IP address, the DHCP server broadcasts the DHCP offer message). Here, the DHCP offer message includes network information required by the portable terminal 101 to perform the Wi-Fi communication (for example, an IP address to be assigned to the portable terminal 101, a subnet mask, a default gateway IP address, a DNS IP address, a lease time, etc.). Through the DHCP proposal step, all portable terminals that are located on the same subnet including the portable terminal 101 which transmits the DHCP discover message receive the DHCP offer message.

3. DHCP Request Step

The portable terminal 101 that receives the DHCP offer message recognizes the existence of the DHCP server on the same subnet and broadcasts a DHCP request message to the Ethernet network to request network information including the IP address which is to be assigned to the portable terminal 101. Here, when a plurality of DHCP servers exists on the same subnet, the portable terminal 101 receives a plurality of DHCP offer messages. The portable terminal 101 then selects one DHCP server among a plurality of DHCP servers and records an IP address of the selected DHCP server on a server identifier field (option 54) within the DHCP request message to be broadcasted to the Ethernet network.

The reason why the portable terminal 101 broadcasts the DHCP request message so that all the DHCP servers may receive the DHCP request message is because a plurality of DHCP servers internally save the IP address to be assigned to the portable terminal 101 and other information when sending the DHCP offer message, and thus, a non-selected DHCP server may delete the saved IP address and the other information.

4. DHCP acknowledgement Step

The DHCP server that receives the DHCP request message determines whether the IP address recorded on the server identifier (option 54) within the DHCP request message is its own IP address. If the recorded IP address is its own IP address, the DHCP server broadcasts a DHCP acknowledgement (Ack) message to the Ethernet network (here, the DHCP server broadcasts the DHCP acknowledgement message because the portable terminal 101 is not assigned with the IP address). Here, the DHCP Ack message includes network information including the IP address to be assigned to the portable terminal 101.

Portable terminal 101, after receiving the DHCP acknowledgement message, may configure a network environment specific to itself based on the network information and access the wireless network through the Wi-Fi communication.

Figure 2:
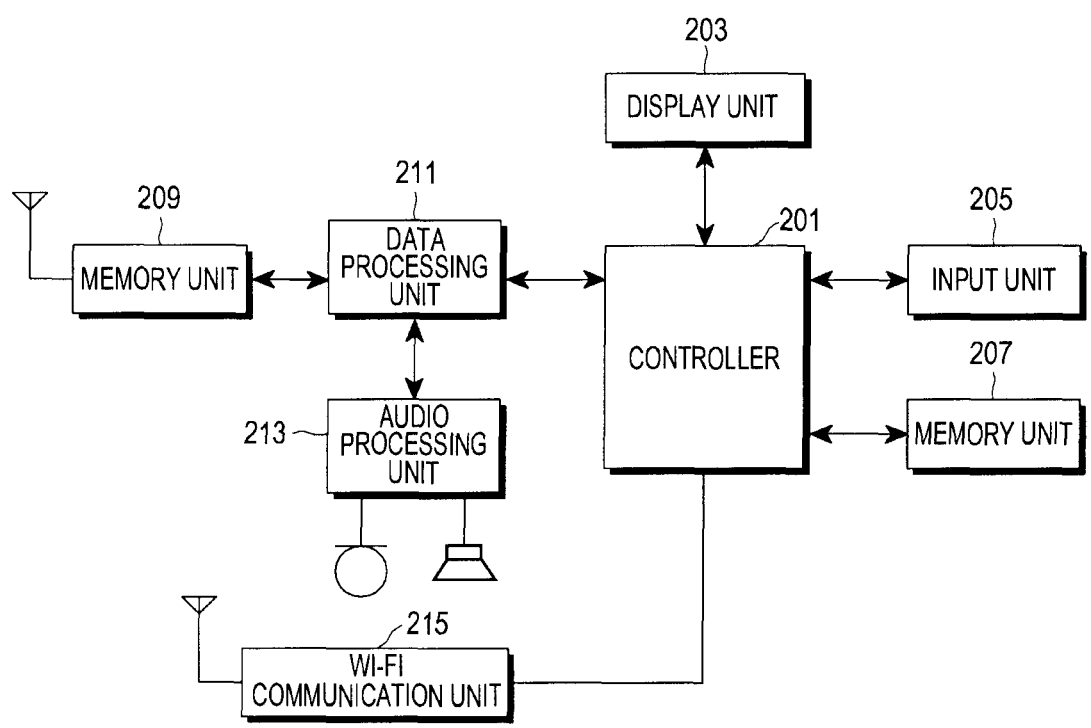
FIG. 2 is a block diagram of a portable terminal according to an exemplary embodiment of the present invention.

FIG. 2 is a block diagram of a portable terminal according to an exemplary embodiment of the present invention.

The portable terminal 101 includes a controller 201, a display unit 203, an input unit 205, a memory unit 207, a radio frequency (RF) unit 209, a data processing unit 211, an audio processing unit 213, and a Wi-Fi communication unit 215.

Regarding each element, the RF unit 209 performs the wireless communication function of the portable terminal 101. Specifically, the RF unit 209 includes a wireless transmitter that performs up conversion and amplification of a transmission signal and a wireless receiver that performs low noise amplification and down conversion of a received signal. Also, the data processing unit 211 includes a transmitter that encodes and modulates the transmission signal, and a receiver that demodulates and decodes a received signal. Here, the data processing unit 211 may be configured as a modem and a codec, and the codec may include a data codec for processing a packet data and an audio codec for processing an audio signal.

The audio processing unit 213 performs functions such as reproducing a received audio signal, output from the data processing unit 211, via a speaker or transmits a transmission audio signal, generated from a microphone, to the data processing unit 211. The input unit 205 includes keys for entering number and character information and function keys for setting various functions, and the display unit 203 displays an image signal on the screen and displays data requested from the controller 201.

If the display unit 203 is implemented in a touch screen such as a capacitive or resistive type, the input unit 205 may include minimum preset keys and the display unit 203 may replace a portion of a key stroke function of the input unit 205. Also, the Wi-Fi communication unit 215 performs the Wi-Fi communication function of the portable terminal 101. In particular, the Wi-Fi communication unit 215 connects to a specific AP under the control of the controller 201 and transmits and receives data through the connected AP.

The memory unit 207 includes a program memory and a data memory. Here, the program memory saves booting and an operating system (hereinafter, referred to as 'OS') to control an overall operation of the portable terminal 101, and the data memory saves various data generated during an operation of the portable terminal. The memory unit 207 may pre-store the Wi-Fi network list. The Wi-Fi network list refers to a list in which a plurality of APs is classified according to the same DHCP server by using the BSSID of the plurality of APs. For example, if the first and the second APs are connected to the first DHCP server, the third AP is connected to the second DHCP server, and the fourth and the fifth APs are connected to the third DHCP server, the Wi-Fi network list 301 may include the first set 303 that includes the BSSID of the first AP 103 and the BSSID of the second AP 105, the second set 305 that includes the BSSID of the third AP 107, and the third set 307 that includes the BSSID of the fourth AP 109 and the BSSID of the fifth AP 111, as shown in FIG. 3.

The controller 201 performs a function of controlling the overall operation of the portable terminal 101. When roaming between the APs is completed by movement from an existing AP cells to a current AP cell, the controller 201 may determined whether the new IP address is to be assigned based on the BSSID of the existing AP, the BSSID of the current AP, and the Wi-Fi network list. The controller 201, based on the verification result, may perform the Wi-Fi communication by using the existing IP address or be assigned with the new IP address and perform the Wi-Fi communication by using the new assigned IP address.

The controller 201 verifies whether the Wi-Fi roaming is completed. When the Wi-Fi roaming is completed according to a verification result, the controller 201 verifies BSSIDs corresponding to the APs (the existing AP and the current AP).

The controller 201 detects the pre-stored Wi-Fi network list and confirms whether the verified BSSIDs exist within the same set of the detected Wi-Fi network list. The Wi-Fi network list refers to the list which classifies a plurality of APs by the same DHCP server by using the BSSID of the plurality of APs.

For example, if the verified BSSIDs are the first and the second BSSIDs and the Wi-Fi network list is configured as in FIG. 3, the first and the second BSSIDs belong to the first set 303 of the network list 301, and thus, the controller 201 may decide that the verified BSSID exist within the same set. In another example, if the verified BSSIDs are the second and the third BSSID and the Wi-Fi network list is configured as in FIG. 3, the second BSSID belongs to the first set 303 and the third BSSID belongs to the second set 305, and thus, the controller 201 may decide that the verified BSSIDs do not exist within the same set because.

According to a verification result, when the verified BSSIDs exist in the same set, the controller 201 determines that the APs are connected to the same DHCP server and performs the Wi-Fi communication by using an IP address that is already in use without performing the DHCP procedure.

In contrast, when the verified BSSIDs do not exist in the same set, the controller 201 verifies whether the verified BSSIDs exist in different sets. For example, if the verified BSSIDs are the second and the third BSSIDs and the Wi-Fi network list is configured as in FIG. 3, the second BSSID belongs to the first set 303 and the third BSSID belongs to the second set 305, and thus, the controller 201 may decide that the verified BSSIDs exist in different sets. In another example, if the verified BSSIDs are the second and sixth BSSIDs and the Wi-Fi network list is configured as in FIG. 3, the second BSSID belongs to the first set 303 and the sixth BSSID does not belong to the Wi-Fi network list, and thus, the controller 201 may decide that the verified BSSIDs do not exist in different sets.

According to a verification result, if the verified BSSIDs exist in the different sets of the Wi-Fi network list, the controller 201 generates a DHCP extension request message and transmits the generated DHCP extension request message to the DHCP server. Here, the DHCP extension request message is a message for extending a lease term of the IP address. Here, the controller 201 unicasts the DHCP extension request message because the IP address has already been assigned to the portable terminal 101 and the portable terminal 101 and the DHCP server know each other's IP address. Further, the DHCP extension request message includes an IP address of the portable terminal 101 which requests for lease term extension within a client IP Address (hereinafter, referred to as 'ciaddr') field.

Also, the controller 201 verifies whether a DHCP server response message is received by the portable terminal 101. Here, the DHCP server response message refers to a response to the DHCP extension request message and may be one of the DHCP acknowledgement (Ack) message or a DHCP non-acknowledgement (Nack) message. The DHCP acknowledgement message is a message indicating that the IP address lease renewal has been acknowledged, and includes the IP address to be used by the portable terminal 101, the subnet mask, the default gateway IP address, and the DNS IP address, and the lease term. The DHCP non acknowledgement message is a message indicating that the IP address lease renewal has been rejected.

According to a verification result, upon receipt of the DHCP server response message, the controller 201 analyzes the received DHCP server response message to verify whether the IP address lease term extension has been accepted. Here, the controller 201 determines that the IP address lease term extension has been accepted if the DHCP server response message is the DHCP acknowledgement message and determines that the IP address lease term extension has been rejected if the DHCP server response message is the DHCP non-acknowledgement message.

According to the verification result, when it is determined that the lease term extension of the IP address has not been approved, the controller 201 decides that APs are connected to different DHCP servers, is assigned a new IP address from the DHCP server by performing the DHCP procedure, and performs the Wi-Fi communication by using the newly assigned IP address.

In contrast, when it is determined that the IP address lease term extension has been accepted, the controller 201 decides that the APs are connected to the same DHCP server and performs the Wi-Fi communication by using the existing IP address without performing the DHCP procedure. Also, the controller 201 combines sets including the verified BSSID into one set, thereby modifying the Wi-Fi network list.

Figure 5A:
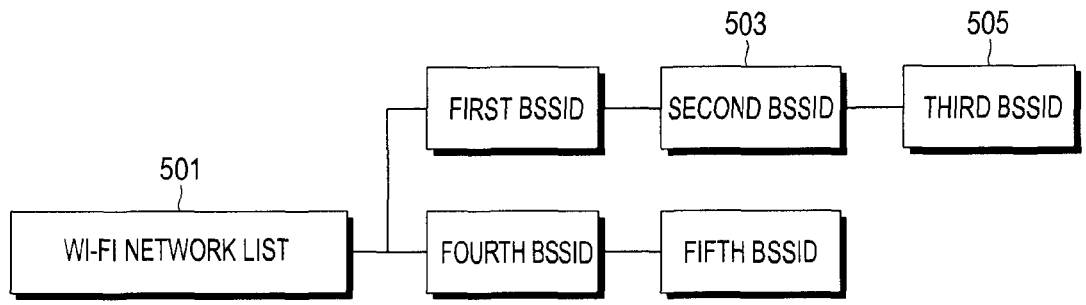
FIG. 5A, FIG. 5B and FIG. 5C are respective example Wi-Fi network lists illustrating changes in a Wi-Fi network list in a portable device according to an exemplary embodiment of the present invention.
Figure 5B:
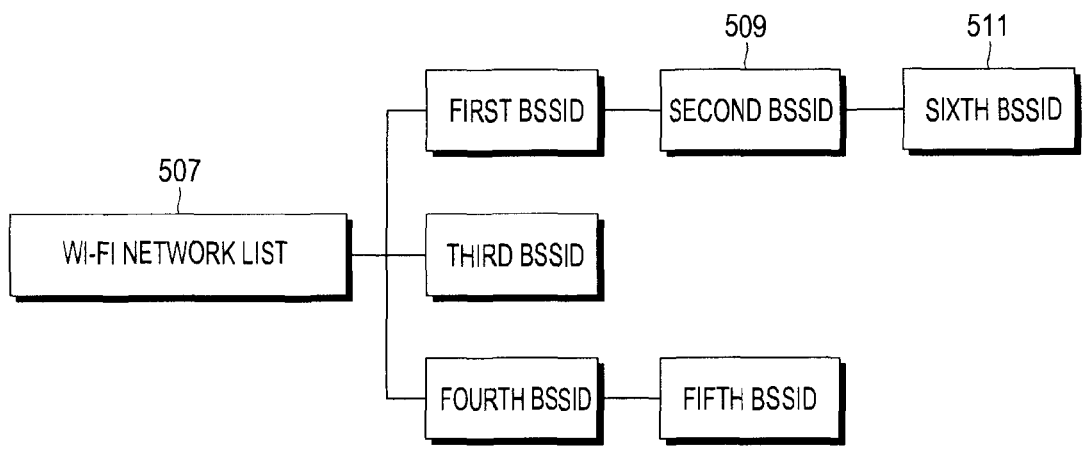
Figure 5C:
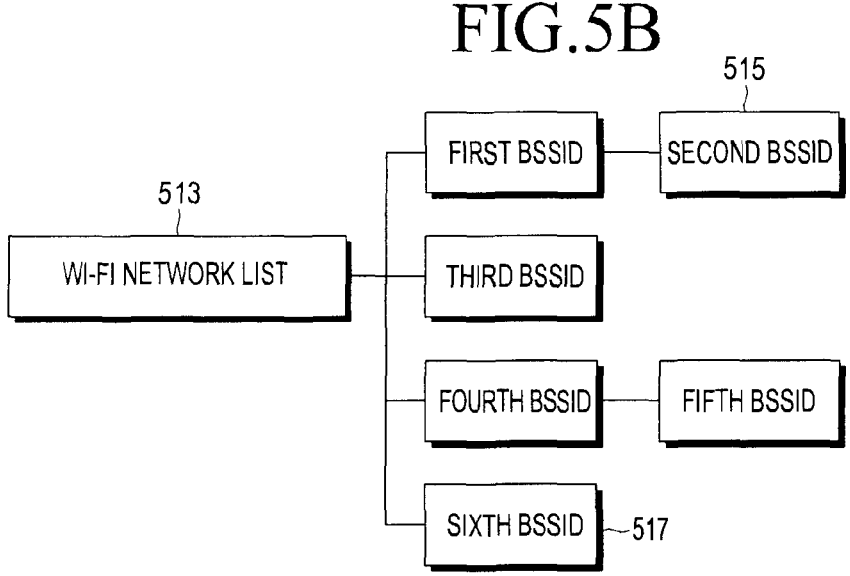

For example, if the verified BSSIDs are the second and the third BSSIDs and the Wi-Fi network list is configured as in FIG. 3, the controller 201 may combine the first set 303 which includes the second BSSID and the second set 305 which includes the third BSSID, thereby generating the Wi-Fi network list including the second BSSID 503 and the third BSSID 505, as shown in FIG. 5.

According to a verification result, when the verified BSSIDs do not exist within the different sets, the controller 201 decides that a BSSID of a current AP among the verified BSSIDs does not exist within the Wi-Fi network list. Also, the controller 201 transmits the DHCP extension request message and verifies whether the DHCP server response message is received in response thereto. When it is determined that the DHCP server response message is received, the controller 201 analyzes the received DHCP server response message to verify whether the IP address lease term extension has been approved.

When it is determined that the IP address lease term extension has been accepted, the controller 201 determines that the APs are connected to the same DHCP server and performs the Wi-Fi communication by using the IP address that is already in use without performing the DHCP procedure. Also, the controller 201 changes the Wi-Fi network by adding the BSSID of the current AP within the set which has the BSSID of the existing AP.

For example, if the verified BSSIDs are the second and the sixth BSSIDs and the Wi-Fi network list is configured as in FIG. 3, the controller 201 may generate the Wi-Fi network list including a second BSSID 509 and a sixth BSSID 511 by adding the sixth BSSID to the first set 303 which includes the second BSSID, as shown in FIG. 5.

When it is determined that the IP address lease term extension has been rejected, the controller 201 determines that the APs are connected to the different DHCP servers and is assigned the new IP address from the DHCP server by performing the DHCP procedure. Also, the controller 201 performs the Wi-Fi communication by using the newly assigned IP address and changes the Wi-Fi network list by generating a set that includes the BSSID of the current AP within the Wi-Fi network list.

For example, if the verified BSSIDs are the second and the sixth BSSID, and the Wi-Fi network list is configured as in FIG. 3, the controller 201 may generate the Wi-Fi network list which includes a fourth set 517, as shown in FIG. 5, by adding the fourth set 517 which includes the sixth BSSID, separate from a first set 515 which includes the second BSSID.

FIG. 3 is a view illustrating a Wi-Fi network list according to an exemplary embodiment of the present invention.

The Wi-Fi network list refers to a list which classifies a plurality of APs connected to the portable terminal according to the same DCHP server by using the BSSIDs of the plurality of APs and is pre-stored in the memory unit 207. For example, if the first and the second APs are connected to the first DHCP server, the third AP is connected to the second DHCP, and the fourth and the fifth APs are connected to the third DHCP, the controller 201 may generate and save the Wi-Fi network list 301 including the first set 303 which includes the BSSID of the first AP 103 and the BSSID of the second AP 105, the second set 305 which includes the BSSID of the third AP 107, and the third set 307 which includes the BSSID of the fourth AP 109 and the BSSID of the fifth AP 111 in the memory unit 207, as shown in FIG. 3.

Figure 4A:
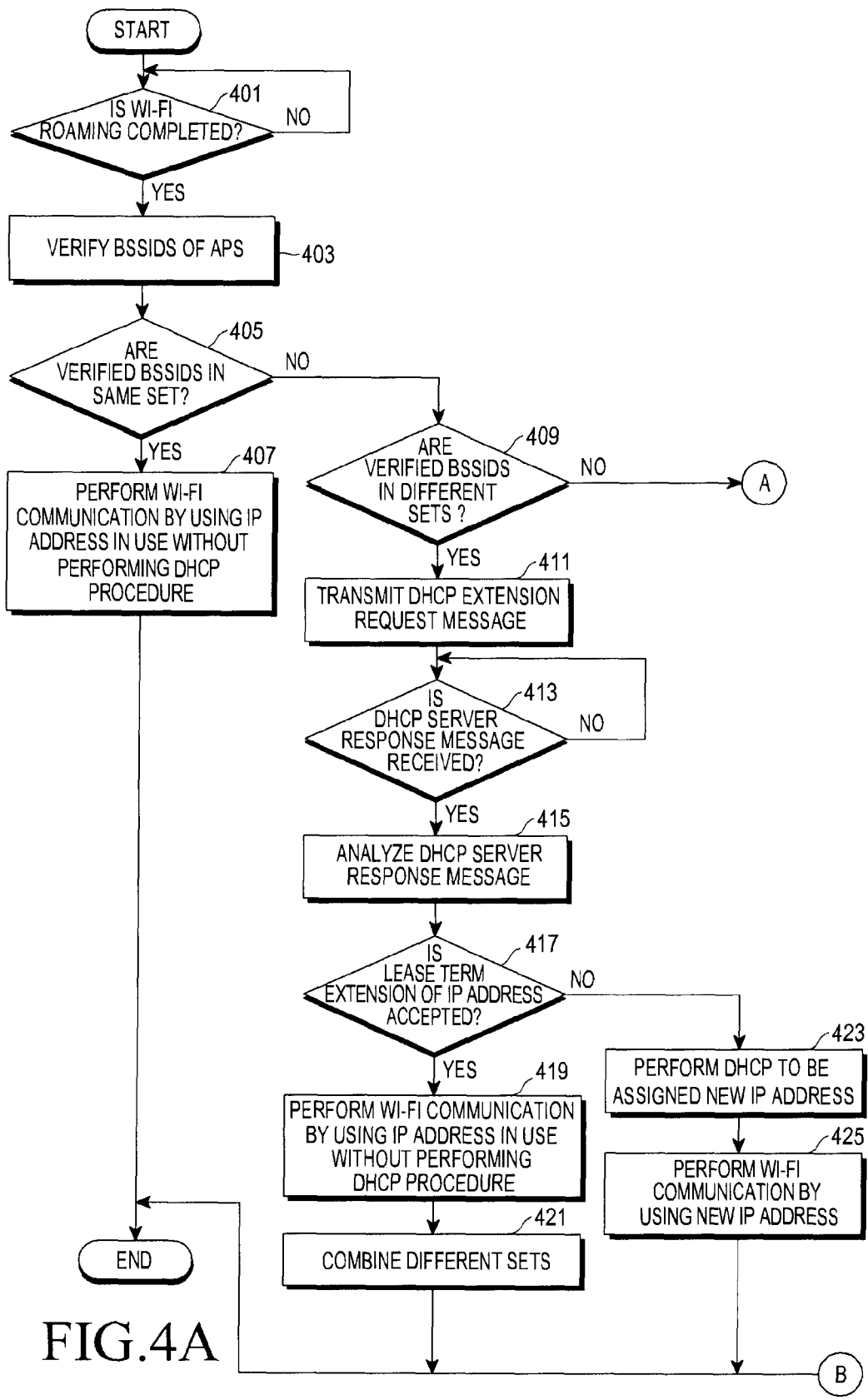
FIG. 4A, and FIG. 4B are flowcharts of a method of performing a wireless communication in a portable terminal according to an exemplary embodiment of the present invention.
Figure 4B:
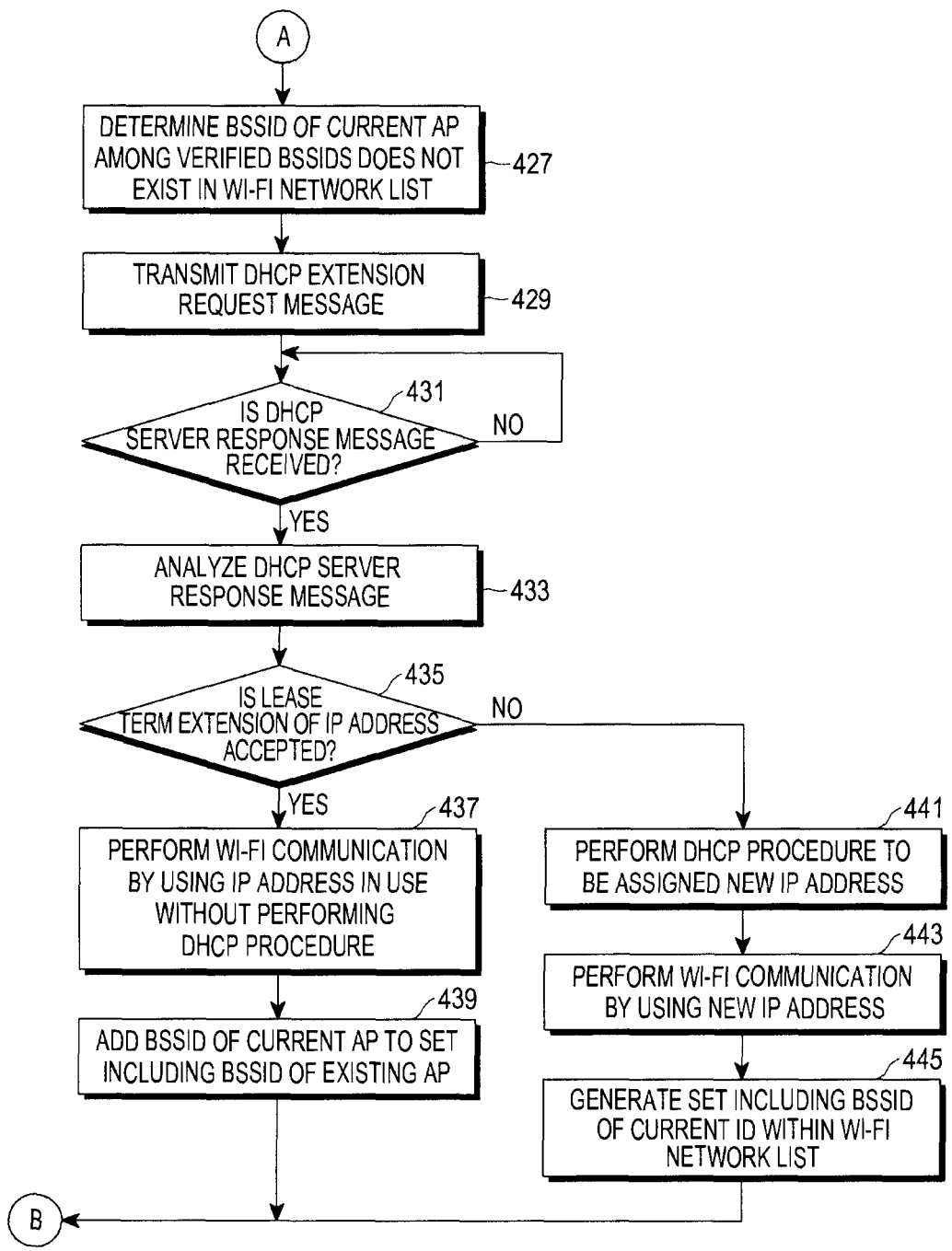

FIGS. 4A and 4B are flowcharts of performing a wireless communication in a portable terminal according to an exemplary embodiment of the present invention.

At step 401, the controller 201 verifies whether the Wi-Fi roaming is completed. The Wi-Fi roaming is a technology that prevents the Wi-Fi communication from being disconnected even though the portable terminal 101 moves between APs that have different BSSs.

When it is determined that the Wi-Fi roaming is completed, the controller 201 proceeds to step 403, otherwise, proceeds to step 401 repeatedly.

When the controller proceeds to step 403, the controller 201 verifies BSSIDs corresponding to APs (the existing AP and the current AP) and proceeds to step 405. Here, the current AP refers to an AP that forms a cell in which the portable terminal 101 is currently located, and the existing AP refers to an AP that forms a cell in which the portable terminal 101 is located prior to movement.

Also, at step 405, the controller 201 detects the pre-stored Wi-Fi network list and verifies whether the verified BSSIDs exist within the same set of the detected Wi-Fi network list. Here, the Wi-Fi network list is the list which classifies a plurality APs according to the same DHCP server by using the BSSIDs of the plurality of APs.

For example, if the verified BSSIDs are the first and the second BSSIDs and the Wi-Fi network list is configured as in FIG. 3, the first and the second BSSIDs belong to the first set 303 of the network list 301, and thus, the controller 201 may decide that the verified BSSIDs exist within the same set. In another example, if the verified BSSIDs are the second and the third BSSIDs and the Wi-Fi network list is configured as in FIG. 3, the second BSSID belongs to the first set 303 and the third BSSID belongs to the second set 305, and thus, the controller 201 may determine that the verified BSSIDs do not exist within the same set.

When it is determined that the verified BSSIDs exist within the same set, the controller 201 proceeds to step 407. Otherwise, the controller 201 proceeds to step 409.

If the controller proceeds to step 407, the controller 201 determines that the APs are connected to the same DHCP server and performs the Wi-Fi communication by using the IP address which is already in use without performing the DHCP procedure.

When the controller proceeds to step 409, the controller 201 verifies whether the verified BSSIDs exist in the different sets of the Wi-Fi network list. For example, if the verified BSSIDs are the second and the third BSSIDs and the Wi-Fi network list is configured as in FIG. 3, the second BSSID belongs to the first set 303 and the third BSSID belongs to the second set 305, and thus, the controller 201 may determine that the verified BSSIDs exist in the different sets. In another example, if the verified BSSIDs are the second and the sixth BSSIDs and the Wi-Fi network list is configured as in FIG. 3, the second BSSID belongs to the first set 303 and the sixth BSSID does not belongs to the Wi-Fi network list, and thus, the controller 201 may determine that the verified BSSIDs do not exist in the different sets.

When it is determined that the verified BSSIDs exist in the different sets, the controller 201 proceeds to step 411, otherwise, the controller 201 proceeds to step 427.

When the controller proceeds to step 411, the controller 201 generates the DHCP extension request message, transmits the generated DHCP extension request message to the DHCP server, and proceeds to step 413. Here, the controller 201 unicasts the DHCP extension request message because the IP address has already been assigned to the portable terminal 101 and the portable terminal 101 and the DHCP server know each other's IP address. Also, the DHCP extension message includes the IP address of the portable terminal 101, which requests the lease term extension, within the client IP Address (hereafter referred to as 'ciaddr') field.

And at step 413, the controller 201 verifies whether the DHCP server response message is received. Here, the DHCP server response message is the response for the DHCP extension request message, and may be either DHCP acknowledgement (Ack) message or DHCP non-acknowledgement (Nack) message. The DCHP acknowledgement message is a message indicating that the lease term extension of the IP address has been approved and includes the IP address to be used by the portable terminal 101, the subnet mask, the default gateway IP address, the DNS IP address, and the lease term. The DHCP non-acknowledgement message is a message indicating that the lease term extension of the IP address has been rejected.

According to the verification result, when the DHCP server response message is received, the controller 201 proceeds to step 415, otherwise, performs step 413 repeatedly.

When the controller 201 proceeds to step 415, the controller 201 analyzes the received DHCP server response message and confirms whether the IP address lease term extension has been approved based on the analysis results, at step 417. Here, when the DHCP server response message is the DHCP acknowledgement message, the controller 201 determines that the lease term extension of the IP address has been approved, and when the DHCP server response message is the DHCP non-acknowledgement message, the controller 201 determines that the lease term extension of the IP address is not approved.

According to a verification result, when it is determined that the IP address lease term extension has not been approved, the controller 201 proceeds to step 423, otherwise, proceeds to step 419.

If the controller 210 proceeds to step 423, the controller 201 determines that the APs are connected to the different DHCP servers and performs the DHCP procedure to be assigned a new IP address from the DHCP server, and, at step 425, the controller 201 performs the Wi-Fi communication by using newly assigned IP address.

Here, the DCHP procedure is a procedure for the portable terminal 101 to be assigned the new IP address from the DHCP server, and includes the following four steps.

1. DHCP Discovery Step

The portable terminal 101 broadcasts the DHCP discover messages to the Ethernet network through the network for the purpose of discovering the DHCP server located in the same subnet (Here, the portable terminal 101 sets the destination MAC of the Ethernet header as Broadcast MAC=FF:FF:FF:FF:FF:FF). Through the DHCP discovery step, all DHCP servers located in the same subnet receive the DHCP discover message.

2. DHCP Proposal Step

The DHCP server which receives the DHCP discover message broadcasts the DHCP offer message to the Ethernet network to announce its presence (here, the DHCP server broadcasts the DHCP offer message since the portable terminal 101 is not assigned an IP address). Here, the DHCP offer message includes the network information (for example, the IP address to be assigned to the portable terminal 101, the subnet mask, the default gateway IP address, the DNS IP address, the lease term, etc.) which is required by the portable terminal 101 to perform the Wi-Fi communication. Through the DHCP proposal step, all portable terminals on the same subnet including the portable terminal 101 which transmits the DHCP discover message receive the DHCP offer message.

3. DHCP Request Step

The portable terminal 101 which receives the DHCP offer message recognizes that the DHCP server exists on the same subnet and broadcasts the DHCP request message to the Ethernet network for the purpose of requesting the network information including the IP address to be assigned to portable terminal 101. Here, the portable terminal 101 receives a plurality of DHCP offer messages if a plurality of DHCP servers exists on the same subnet. The portable terminal 101 which receives the plurality of DHCP offer messages selects one DHCP server among the plurality DHCP servers and records the IP address of the selected DHCP server in the server identifier (option 54) field of DHCP request message server to be broadcasted to the Ethernet network.

The reason why the portable terminal 101 broadcasts the DHCP request message so that all the DHCP servers may receive the DHCP request message is because a plurality of DHCP servers internally save the IP address to be assigned to the portable terminal 101 and other information when sending the DHCP offer message, and thus, a non-selected DHCP server may delete the saved IP address and the other information.

4. DHCP Approval Step

The DHCP server which receives the DHCP request message verifies if the recorded IP address on the server identifier (option 54) within the DHCP request message is its IP address. If the recorded IP address is its IP address, the DHCP server broadcasts the DHCP acknowledgement (Ack) message to the Ethernet (here, the DHCP server broadcasts the DHCP acknowledgement message because the portable terminal 101 has not been assigned the IP address). Here, DHCP acknowledgement message includes the network information including the IP address to be assigned to the portable terminal 101.

The portable terminal 101 which receives the DHCP acknowledgement message may configure the network environment of the portable terminal 101 based on network information and access to wireless internet through the Wi-Fi communication.

When the controller 201 proceeds to step 419, the controller 201 determines that the APs are connected to the same DHCP server, perform the Wi-Fi communication using the IP address which is already in use without performing the DHCP procedure, and proceeds to step 421. At step 421, the controller 201 changes the Wi-Fi network list by combining the sets including the verified BSSIDs as one set.

For example, if the verified BSSIDs are the second and the third BSSDs and the Wi-Fi network list is configured as shown in FIG. 3, the controller 201 may generate the Wi-Fi network list including the second BSSID 503 and the third BSSID 505 by combining the first set 303 that has the second BSSID and the second set 305 that has the third BSSID, as shown in FIG. 5.

When the controller 201 proceeds to step 427, the controller 201 determines that the BSSID of the current AP among the verified BSSIDs does not exist in the Wi-Fi network list and proceeds to step 429. At step 429, the controller 201 transmits the DHCP extension request message and, at step 431, verifies if the DHCP server response message in response to the DHCP extension request message is received. When it is determined that the DHCP server response message is received, the controller 201 proceeds to step 433, otherwise, the controller 201 performs the step 431 repeatedly.

When the controller 201 proceeds to step 433, the controller 201 analyzes the received DHCP server response message and, at step 435, verifies whether the IP address lease term extension has been accepted based on the analyzed result.

When it is determined that the IP address lease term extension has been accepted, the controller 201 proceeds to step 437, otherwise, proceeds to step 441.

If the controller 201 proceeds to step 437, the controller 201 determines that the APs are connected to the same DHCP server, performs the Wi-Fi communication by using the IP address that is already in use without performing the DHCP procedure, and proceeds to step 439. At step 439, the controller 201 changes the Wi-Fi network list by adding the BSSID of the current AP to the BSSID of the existing AP set.

For example, if the verified BSSIDs are the second and the sixth BSSIDs and the Wi-Fi network list is configured as shown in FIG. 3, the controller 201 may generate the Wi-Fi network list including a second BSSID 509 and a sixth BSSID 511 by adding the sixth BSSID to the first set 303 that includes the second BSSID, as shown in FIG. 5.

If the controller 201 proceeds to step 441, the controller 201 determines that the APs are connected to different DHCP servers, is assigned the new IP address from the DHCP server by performing the DHCP procedure, and proceeds to step 443. At step 443, the controller 201 performs the Wi-Fi communication by using the newly assigned IP address and proceeds to step 445.

Also, at step 445, the controller 201 changes the Wi-Fi network list by generating a set that includes the BSSID of the current AP within the Wi-Fi network list. For example, the verified BSSIDs are the second and the sixth BSSIDs and the Wi-Fi network list is configured as shown in FIG. 3, the controller 201 may generate the Wi-Fi network list including the fourth set 517 by adding the fourth set 517 that includes the sixth BSSID separately from the first set 515 including the second BSSID, as shown in FIG. 5.

FIG. 5 is a view illustrating a change in a Wi-Fi network list in a portable terminal according to an exemplary embodiment of the present invention.

Referring to FIG. 5, when the BSSIDs of the APs exist in the different sets of the Wi-Fi network list but the APs are connected to the same DHCP server, the portable terminal 101 changes the Wi-Fi network list by combining the different sets into one set.

For example, if the BSSID of the APs are the second and the third BSSIDs and the second and the third BSSIDs exist in the different sets but the APs are connected to the same DHCP server, the controller 201 may generate a first Wi-Fi network list 501 which includes the second BSSID 503 and the third BSSID 505 by combining the first set 303 including the second BSSID of the Wi-Fi network list 301 and the second set 305 including the third BSSID, as shown in FIG. 5.

Also, when the BSSID of the current AP among the BSSIDs of the APs does not exist in the Wi-Fi network list but the APs are connected to the same DHCP server, the portable terminal 101 changes the Wi-Fi network list by adding the BSSID of the current AP into the set that includes the BSSID of the existing AP.

For example, the BSSIDs of the APs are the second and the sixth BSSIDs, and the sixth BSSID does not exist in the Wi-Fi network list, but the APs are connected to the same DHCP server, the controller 201 may generate a second Wi-Fi network list 507 which includes the second BSSID 509 and the sixth BSSID 511 by adding the sixth BSSID into the first set 303 which includes the second BSSID of the Wi-Fi network list 301 of the FIG. 3, as shown in FIG. 5.

Also, when the BSSID of the current AP among the BSSIDs of the APs does not exist in the Wi-Fi network list but the APs are connected to the different DHCP servers, the portable terminal 101 changes the Wi-Fi network list by generating a new set which includes the BSSID of the current AP in the Wi-Fi network list.

For example, if the BSSIDs of the APs are the second and the sixth BSSIDs, and the sixth BSSID does not exist in the Wi-Fi network list but the APs are connected to the different DHCP servers, the controller 201 may generate a third Wi-Fi network list 513 that includes the fourth set 517 by generating the fourth set 517 which includes the sixth BSSID to the Wi-Fi network list 301, as shown in FIG. 5.

Through the above operations, therefore, the present invention provides an apparatus and a method that provides a wireless communication in a portable terminal, thereby achieving an effect of minimizing disconnection of wireless communication. Further, the present invention provides an apparatus and a method that provides a wireless communication in the portable terminal, thereby achieving an effect of minimizing power consumption. Methods for providing a wireless communication in a portable terminal according to the present invention as described above may be implemented in a computer readable code on a computer readable recording medium. The computer readable recording medium include any type of recording medium that can store data readable by a computing device. Examples of the computer readable recording medium include ROM, RAM, optical disks, magnetic tapes, floppy disks, hard disks, and non-volatile memory. The computer readable instructions can also be transmitted from the recording medium in a carrier wave (e.g., transmission through Internet) to the portable terminal for storage in its memory. Also, the computer readable recording medium may be distributed in a network connected computing device so that the computer readable code is stored and executed in a distributed fashion.

Consequently, the methods described herein can be rendered with the use of such software that is stored on the recording medium using a general purpose computing device, such as a general portable terminal, or a special processor or in programmable or dedicated hardware, such as an ASIC or FPGA. As would be understood in the art, the computing device, the processor, microprocessor controller or the programmable hardware include memory components, e.g., RAM, ROM, Flash, etc. that may store or receive software or computer code that when accessed and executed by the computing device, processor or hardware implement the processing methods described herein. In addition, it would be recognized that when a general purpose computing device accesses code for implementing the processing shown herein, the execution of the code transforms the general purpose computing device into a special purpose computing device for executing the processing shown herein.

What is claimed is:

1. An apparatus for providing a wireless communication in a portable terminal, comprising: a wireless communication unit; and a controller configured to: obtain basic service set identifications (BSSIDs) of access points when roaming between access points, determines whether an existing internet protocol (IP) address, used for a current connection to a first access point, is to be maintained after connection to a second access point, based on a wireless communication network list stored in memory within the portable terminal and the BSSIDs, and perform wireless communication by using an IP address corresponding to a determination result, wherein the wireless communication network list is a list which classifies a plurality of access points according to one or more dynamic host configuration protocol (DHCP) servers by using BSSIDs of the plurality of access points, and the wireless communication network list having been generated at the portable terminal based on previous communicative connection between the portable terminal and at least one of the plurality of access points, and in response to a determination that an obtained BSSID of the second access point is in a different set of the network list than that of the first access point, or does not exist in the network list, the controller generates a request for a lease term extension of the IP address, transmits the request for a lease term extension of the IP address to a DHCP server, receives a response message from the DHCP server in response to the request, and modifies the network list based on the response message wherein, when the obtained BSSID of the second access point is in a different set of the network list than that of the first access point, the controller generates and transmits a first message requesting a lease term extension of the IP address, and when a second message indicating an approval of the lease term extension is received in response to the first message, the controller performs the wireless communication with the second access point by using the existing IP address and modifies the wireless communication network list by combining the different sets into one set.

2. The apparatus of claim 1, wherein the wireless communication is a Wi-Fi communication.

3. The apparatus of claim 1, wherein, when the BSSIDs exist in one set of the wireless communication network list, the controller performs the wireless communication with the second access point by using the existing IP address.

4. The apparatus of claim 1, wherein, when a third message indicating a non-approval of the lease term extension is received in response to the first message, the portable terminal is assigned a new IP address and the controller performs the wireless communication with the second access point by using the new IP address.

5. The apparatus of claim 1, wherein, when a BSSID of the second access point (AP) among the obtained BSSIDs does not exist within the wireless communication network list, the controller generates and transmits a fourth message requesting a lease term extension of the IP address, and when a fifth message indicating an approval of the lease term extension is received in response to the fourth message, the controller performs the wireless communication with the second AP by using the existing IP address and modifies the wireless communication network list by adding the BSSID of the second AP.

6. The apparatus of claim 5, wherein, when a sixth message indicating a non-approval of the lease term extension is received in response to the fourth message, the portable terminal is assigned a new IP address, performs the wireless communication with the second access point by using the new IP address, and modifies the wireless communication network list by adding a new set including the BSSID of the second AP to the wireless communication network list.

7. A method of providing a wireless communication in a portable terminal, comprising: obtaining basic service set identifications (BSSIDs) of access points when roaming between access points; determining whether an existing internet protocol (IP) address, used for a current connection to a first access point, is to be maintained after connection to a second access point, based on a wireless communication network list stored in memory within the portable terminal and the BSSIDs; and performing wireless communication by using an IP address corresponding to a determination result, wherein performing the wireless communication comprises: in response to a determination that an obtained BSSID of the second access point is in a different set of the network list than that of the first access point, or does not exist in the network list, generating a request for a lease term extension of the IP address, transmitting the request for a lease term extension of the IP address to a DHCP server, receiving a response message from the DHCP server in response to the request, and modifying the wireless communication network list based on the response message, wherein the wireless communication network list is a list which classifies a plurality of access points according to one or more dynamic host configuration protocol (DHCP) servers by using BSSIDs of the plurality of access points, and the wireless communication network list having been generated at the portable terminal based on previous communicative connection between the portable terminal and at least one of the plurality of access points, wherein performing the wireless communication further comprises: when the obtained BSSID of the second access point is in a different set of the network list than that of the first access point, generating and transmitting a first message requesting a lease term extension of the IP address; when a second message indicating an approval of the lease term extension is received in response to the first message, performing the wireless communication with the second access point by using the existing IP address; and modifying the wireless communication network list by combining the different sets into one set.

8. The method of claim 7, wherein the wireless communication is a Wi-Fi communication.

9. The method of claim 7, wherein, performing the wireless communication comprises performing the wireless communication by using the existing IP address when the obtained BSSIDs exist in one set of the wireless communication network list.

10. The method of claim a 7, further comprising: when a third message indicating a non-approval of the lease term extension is received in response to the first message, being assigned a new IP address; and performing the wireless communication with the second access point by using the new IP address.

11. The method of claim 7, wherein performing the wireless communication comprises: when a BSSID of the second access point (AP) among the obtained BSSIDs does not exist within the wireless communication network list, generating and transmitting a fourth message requesting a lease term extension of the IP address; and when a fifth message indicating an approval of the lease term extension is received in response to the fourth message, performing the wireless communication with the second AP by using the existing IP address; and modifying the wireless communication network list by adding the BSSID of the second AP.

12. The method of claim 11, further comprising: when a sixth message indicating a non-approval of the lease term extension is received in response to the fourth message, being assigned a new IP address; performing the wireless communication with the second AP by using the new IP address; and modifying the wireless communication network list by adding a new set including the BSSID of the second AP to the wireless communication network list.

13. An electronic device for providing wireless communication, comprising: a wireless communication unit; a memory that stores a network list containing a plurality of basic service set identifications (BSSIDs) of respective access points (APs) to which the electronic device was previously connected, the network list having been generated at the electronic device based on previous connection between the electronic device and at least one of the respective APs, and the network list containing at least one set of BSSIDs of APs connected to a common dynamic host configuration protocol (DHCP) server; and a controller configured to: control the wireless communication using an existing Internet Protocol (IP) address through a first AP having a first BSSID prior to a roaming operation; and during the roaming operation, obtain a second BSSID of a second AP, consult the network list to determine whether the first and second BSSIDs are in the same set associated with a common DHCP server in the network list; wherein when the first and second BSSIDs are in the same set, a connection is made to the second AP for wireless communication using the existing IP address without performing a DHCP procedure to obtain an IP address; and in response to a determination that the second BSSID is in a different set of the network list than that of the first BSSID, or does not exist in the network list, the controller generates a request for a lease term extension of the IP address, transmits the request for a lease term extension of the IP address to DHCP server, receives a response message from the DHCP server in response to the request, and modifies the network list based on the response message, wherein: when the determination is that the first and second BSSIDs are not in the same set, the controller generates and transmits a first message requesting a lease term extension of the existing IP address; and when a second message indicating an approval of the lease term extension is received in response to the first message, the controller performs the wireless communication with the second AP by using the existing IP address, and modifies the wireless communication network list by adding the second BSSID to a set containing the first BSSID.

14. The electronic device of claim 13, wherein, when a third message indicating a non-approval of the lease term extension is received in response to the first message, the electronic device is assigned a new IP address, and the wireless communication with the second AP by using the new IP address.

15. The electronic device of claim 14, wherein, when the determination is that the second BSSID does not exist within the network list, the controller generates and transmits a fourth message requesting a lease term extension of the existing IP address, and when a fifth message indicating an approval of the lease term extension is received in response to the fourth message, the controller performs the wireless communication with the second AP by using the existing IP address and modifies the network list by adding the second BSSID.

16. The electronic device of claim 15, wherein, when a sixth message indicating a non-approval of the lease term extension is received in response to the fourth message, the electronic device is assigned a new IP address, performs the wireless communication with the second AP by using the new IP address, and modifies the network list by adding a new set including the second BSSID to the network list.

17. An electronic device for providing wireless communication, comprising: a wireless communication unit; a memory that stores a network list containing a plurality of basic service set identifications (BSSIDs) of respective access points (APs) to which the electronic device was previously connected, the network list having been generated at the electronic device based on previous connection between the electronic device and at least one of the respective APs, and the network list containing at least one set of BSSIDs of APs connected to a common dynamic host configuration protocol (DHCP) server; and a controller configured to: control the wireless communication using an existing Internet Protocol (IP) address through a first AP having a first BSSID prior to a roaming operation; and during the roaming operation, obtain a second BSSID of a second AP, consult the network list to determine whether the first and second BSSIDs are in the same set associated with a common DHCP server in the network list; wherein when the first and second BSSIDs are in the same set, a connection is made to the second AP for wireless communication using the existing IP address without performing a DHCP procedure to obtain an IP address; and in response to a determination that the second BSSID is in a different set of the network list than that of the first BSSID, or does not exist in the network list, the controller generates and transmits a request for a lease term extension of the IP address; wherein when it is determined that the second BSSID is in the different set, the controller generates and transmits a first message requesting a lease term extension of the existing IP address, and when a second message indicating an approval of the lease term extension is received in response to the first message, the controller performs the wireless communication with the second AP by using the existing IP address, and modifies the wireless communication network list by adding the second BSSID to a set containing the first BSSID; and wherein when it is determined that the second BSSID does not exist in the network list and the lease term extension is granted, the network list is modified by grouping the second BSSID and the first BSSID within a common set associated with the same DHCP server.

* * * * *